US009829281B2

(12) United States Patent
Radl et al.

(10) Patent No.: US 9,829,281 B2
(45) Date of Patent: Nov. 28, 2017

(54) HYBRID LASER COUNTERMEASURE LINE REPLACEABLE UNIT AND METHOD OF UPGRADING THEREWITH

(71) Applicant: BAE Systems Information and Electronic Systems Integration Inc., Nashua, NH (US)

(72) Inventors: Andrew J. Radl, Dunbarton, NH (US); York E. Young, Amherst, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 15/314,749

(22) PCT Filed: Nov. 16, 2015

(86) PCT No.: PCT/US2015/060908
§ 371 (c)(1),
(2) Date: Nov. 29, 2016

(87) PCT Pub. No.: WO2016/105693
PCT Pub. Date: Jun. 30, 2016

(65) Prior Publication Data
US 2017/0102212 A1   Apr. 13, 2017

Related U.S. Application Data (60) Provisional application No. 62/080,719, filed on Nov. 17, 2014.

(51) Int. Cl.
*F41G 7/22* (2006.01)
*F41H 13/00* (2006.01)
(Continued)

(52) U.S. Cl.
CPC ......... *F41G 7/224* (2013.01); *F41H 13/0056* (2013.01); *G01S 7/4815* (2013.01); *G01S 7/495* (2013.01)

(58) Field of Classification Search
CPC .... F41G 7/224; F41H 13/0056; G01S 7/4815; G01S 7/495
(Continued)

(56) References Cited

U.S. PATENT DOCUMENTS 4,962,319 A * 10/1990 Leonard ............... G01J 5/00
250/231.1
5,226,730 A *  7/1993 Berthold ............... G01H 5/00
374/117

(Continued)

FOREIGN PATENT DOCUMENTS

WO   WO2008141800 A1   11/2008

OTHER PUBLICATIONS

PCT/US15/060908, ISR dated May 26, 2016.

*Primary Examiner* — Bret Hayes
(74) *Attorney, Agent, or Firm* — Scott J. Asmus; Sand & Sebolt, LPA (57) ABSTRACT

A hybrid laser countermeasure line replaceable unit and method of upgrading therewith is provided. The unit includes two generable laser beams, namely, a first pulsed laser beam and a second continuous wave laser beam. Further embodiments may have multiple pulsed and continuous wave laser beams as necessary. The two beams in this single unit either may be generated from a single gain medium or may be generated from multiple gain mediums inside the line replaceable unit. The two beams may be combined if necessary to provide greater likelihood of success as a countermeasure to defend against optically guided incoming threats to a vehicle, such as military aircraft.

17 Claims, 8 Drawing Sheets

(51) Int. Cl.
*G01S 7/481* (2006.01)
*G01S 7/495* (2006.01)

(58) Field of Classification Search
USPC .......................................................... 89/1.11
See application file for complete search history.

(56) References Cited

U.S. PATENT DOCUMENTS

| | | | | |
|---|---|---|---|---|
| 5,965,215 | A * | 10/1999 | Xuan | B23K 26/067 427/129 |
| 5,969,799 | A * | 10/1999 | Sano | G03F 7/70241 355/53 |
| 6,094,300 | A * | 7/2000 | Kashima | G02B 21/002 356/317 |
| 7,590,155 | B2 * | 9/2009 | Liu | H01S 3/06708 372/18 |
| 7,925,159 | B2 | 4/2011 | Dove | |
| 2005/0155956 | A1 * | 7/2005 | Hamada | B23K 26/0626 219/121.69 |
| 2006/0017920 | A1 * | 1/2006 | Tsuchiya | G01N 21/6458 356/317 |
| 2006/0065640 | A1 * | 3/2006 | Lizotte | B23K 26/0604 219/121.61 |
| 2011/0001062 | A1 | 1/2011 | Herman et al. | |
| 2011/0204145 | A1 | 8/2011 | Odhner et al. | |
| 2012/0298748 | A1 | 11/2012 | Factor et al. | |

* cited by examiner

HYBRID LASER COUNTERMEASURE LINE REPLACEABLE UNIT AND METHOD OF UPGRADING THEREWITH

CROSS-REFERENCE TO RELATED APPLICATIONS

This Application claims priority rights under 35 USC §119(e) from PCT Application Serial No. PCT/US2015/060908 filed Nov. 16, 2015, which claims the benefit from U.S. Provisional Application Ser. No. 62/080,719 filed Nov. 17, 2014, the contents of which are incorporated herein by reference.

BACKGROUND

Technical Field

The present disclosure relates to generally electronic countermeasures on vehicles. More particularly, the present disclosure relates to electronic countermeasures utilizing lasers. Specifically, the present disclosure relates to device having at least one pulsed laser and at least one continuous wave laser generated from a single line replaceable unit and a method of upgrading legacy single laser systems with a hybrid laser system for greater countermeasure defenses.

Background Information

Historically, there have been two types of lasers used for electro-optical (EO) infrared (IR) systems for military applications. The first type are pulsed lasers which are used for applications like ranging, LIDAR, designation, and missile countering. The second type are Continuous Wave (CW) lasers which have been used for illumination, missile countering, and targeting. As the requirements for additional capabilities and functionality are developed, the need for multiple integrated pulsed and CW laser sources will be required to meet those new requirements.

Legacy countermeasure systems in current military aircraft and vehicles utilize a single laser system that is a pulsed laser and is often associated with missile countering. These legacy countermeasure laser systems are limited in their defensive capabilities. Namely, threats such as surface-to-air missiles and other optically guided missiles fired from an enemy person or platform (i.e., aircraft) are becoming able to outsmart and avoid legacy single pulsed laser countermeasure systems. The process of upgrading a single laser countermeasure system by reinstalling an entire countermeasure system on a military aircraft is extremely high.

SUMMARY

Issues continue to exist with the devices that produce and carry the two types of lasers (i.e., pulsed and CW lasers) mentioned above. As the requirements for additional defensive capabilities and functionality are developed, a need continues to exist for at least one (or even multiple) integrated pulsed and CW laser sources. Additionally, costs are high in developing completely new countermeasure systems, thus a need exists to provide an improved device for upgrading an existing countermeasure system. The present disclosure addresses these and other issues.

According to one embodiment of the present disclosure invention, a hybrid laser is the integration of multiple (or at least one) pulsed and continuous wave lasers into a single line replaceable unit. The line replaceable unit has the capability to synchronously or independently control the emission timing of each source within the laser. This will enable the ability to create more complex optical CW and pulse waveforms as seen by the threats. The multiple sources can be within the same wavelength band or cover multiple wavelength bands depending on the specific application. The laser technologies that can be included within a hybrid laser are solid-state lasers, fiber lasers, slab laser, semiconductor based lasers, dye lasers, and gas lasers. These embodiment may be part of a Directed Infrared Counter Measures (DIRCM) system capable of defeating both current and expected future optically guided missiles. Further, the embodiments provide improved targeting capability of optically guided incoming threats.

In another embodiment, one aspect of the present disclosure may provide a hybrid laser countermeasure line replaceable unit including: a housing defining an internal cavity housing (i) a single gain medium, or (ii) at least two gain mediums, and a laser beam exit aperture; a transparent lens at the laser beam exit aperture enabling passage of electromagnetic radiation therethrough; a first laser beam generated from within the internal cavity and exiting the laser beam exit aperture, wherein the first laser beam is a pulsed laser beam; and a second laser beam generated from within the internal cavity and exiting the laser beam exit aperture, wherein the second laser beam is a continuous wave (CW) laser beam; wherein the hybrid laser countermeasure line replaceable unit is adapted to replace a legacy single laser unit from a countermeasure system on a vehicle and disable optically guided incoming threats.

In another embodiment, one aspect of the present disclosure may provide a hybrid laser countermeasure line replaceable unit including: a housing defining one or multiple internal cavities and a laser beam first exit aperture and a laser beam second exit aperture; a first transparent lens at the laser beam first exit aperture enabling passage of electromagnetic radiation therethrough; a second transparent lens at the laser beam second exit aperture enabling passage of electromagnetic radiation therethrough; a first laser beam generated from within the internal cavity and exiting the laser beam first exit aperture, wherein the first laser beam is a pulsed laser beam; and a second laser beam generated from within the same or another internal cavity and exiting the laser beam second exit aperture, wherein the second laser beam is a continuous wave (CW) laser beam; wherein the hybrid laser countermeasure line replaceable unit is adapted to replace a legacy single laser unit from a countermeasure system on a vehicle and disable optically guided incoming threats.

In accordance with yet another aspect, an embodiment of the disclosure may provide a method for upgrading a countermeasure laser system comprising the steps of: removing a legacy single laser system in the form of a first line replaceable unit (LRU) from a countermeasure system on a vehicle; providing a hybrid laser countermeasure system in the form of a second LRU including two generable laser beams, wherein a generable first laser beam is a pulsed laser beam and a generable second laser beam is a continuous wave (CW) laser beam; and installing the second LRU into the countermeasure system on the vehicle, wherein the second LRU is adapted to disable an incoming threat to the vehicle.

In another aspect, an embodiment of the disclosure may provide a hybrid laser countermeasure system including: a moveable vehicle adapted to defend against optically guided incoming threats; a legacy power source on the vehicle; a legacy modulation source on the vehicle; a hybrid laser countermeasure assembly in the form of a line replaceable unit including generable first and second laser beams; wherein the first laser beam is a pulsed laser beam powered by the legacy power source external the line replaceable unit and is modulated by the legacy modulation source external the line replaceable unit; wherein the second laser beam a continuous wave laser beam powered by the legacy power source external the line replaceable unit; and wherein the hybrid laser countermeasure line assembly is adapted to replace a legacy single laser unit from the countermeasure system on the vehicle to disable optically guided incoming threats.

Another aspect of an embodiment may provide a hybrid laser countermeasure line replaceable unit and method of upgrading therewith. The unit may include at least two generable laser beams, namely, at least one first pulsed laser beam and at least one second continuous wave laser beam. Further, embodiments may have multiple pulsed and continuous wave laser beams as necessary. The two beams in this single unit either may be generated from a single gain medium or may be generated from multiple gain mediums inside the line replaceable unit. The two beams may be spatially combined into a single laser exit aperture if necessary to provide greater likelihood of success as a countermeasure to defend against optically guided incoming threats to a vehicle, such as military aircraft, or other vehicles. The methods of spatial beam combining include but are not limited to the use of a grating, free space optics utilizing dichroic, trichroic, and N-chroic optical coatings, wherein N equals any number of known chroic optical coatings. Additionally, the combined beam from the two laser beams may be formed form polarization combining.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3 is a bracketed representation identifying FIG. 3A, FIG. 3B, FIG. 3C, and FIG. 3D;

FIG. 7 is a bracketed representation of FIG. 7A, FIG. 7-B, FIG. 7C, and FIG. 7D;

Similar numbers refer to similar parts throughout the drawings.

DETAILED DESCRIPTION

Figure 11:
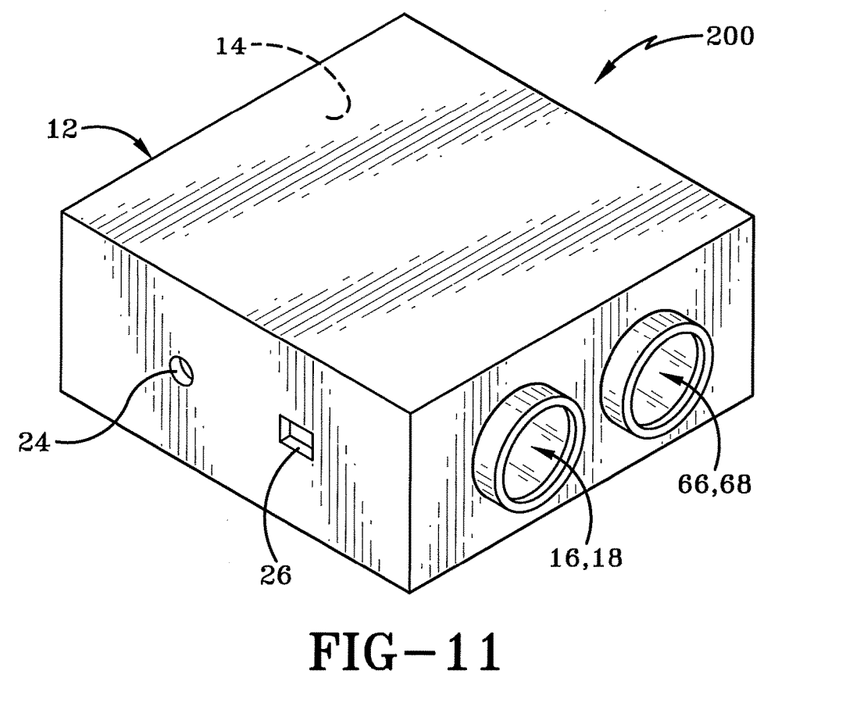
FIG. 11 is a perspective view of a third embodiment of a hybrid laser countermeasure line replaceable unit.

A first embodiment of a hybrid laser countermeasure line replaceable unit is depicted generally as 10 throughout FIG. 1-FIG. 4, and generally depicted as 100 in a second embodiment in FIG. 5-FIG. 8, and generally indicated as 200 in a third embodiment in FIG. 11. Some components of the line replaceable units have structural similarities between the three embodiments and the similar reference numerals depicted herein throughout all of the figures represents similar structures when labeled as such.

Figure 1:
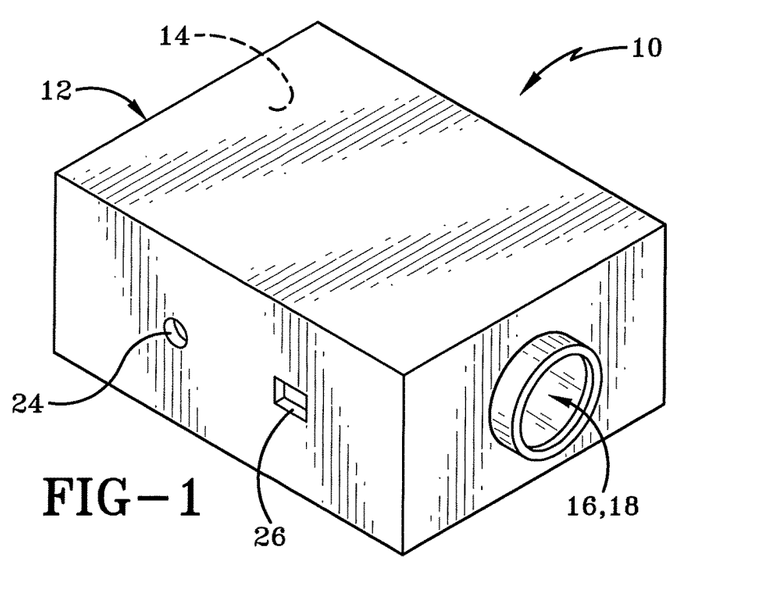
FIG. 1 is a perspective view of a first embodiment of a hybrid laser countermeasure line replaceable unit.
Figure 5:
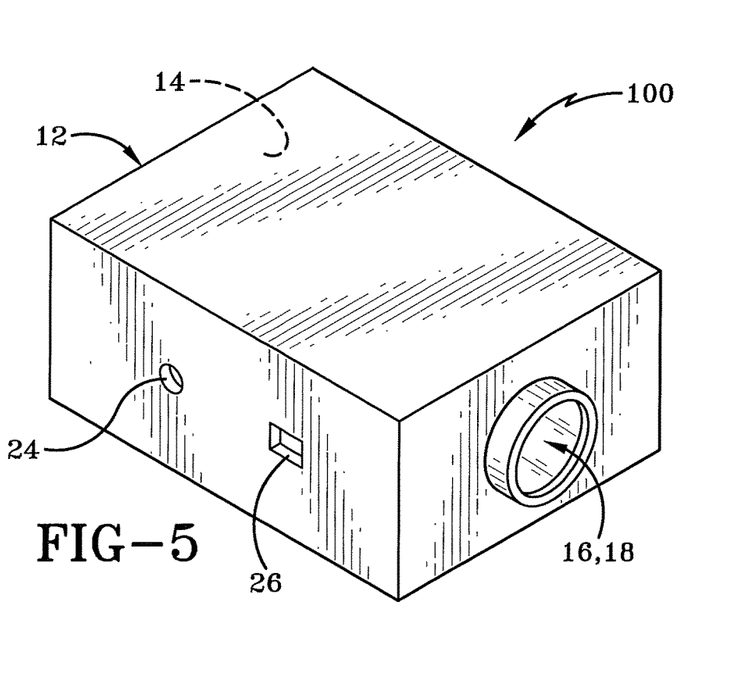
FIG. 5 is a perspective view of a second embodiment of a hybrid laser countermeasure line replaceable unit.

Each of the hybrid laser countermeasure line replaceable units 10, 100, 200 include a housing 12 defining an internal cavity 14 and defining a laser beam exit aperture 16 formed in one of the walls of housing 12, an IR transparent lens 18 at exit aperture 16, a first laser beam 20, and a second laser beam 22.

Housing 12 is generally depicted throughout the figures as a box-like structure comprised of adjoining walls that collectively form internal cavity 14. Housing 12, as depicted throughout the figures, is a general representation and should be entirely understood that housing 12 may come in a variety of shapes and sizes to fit the specific needs of the applications as will be described in greater detail below. Housing 12 includes inlet connection ports for a control source and a power source. Particularly, a control inlet 24 and a power inlet 26.

Figure 2:
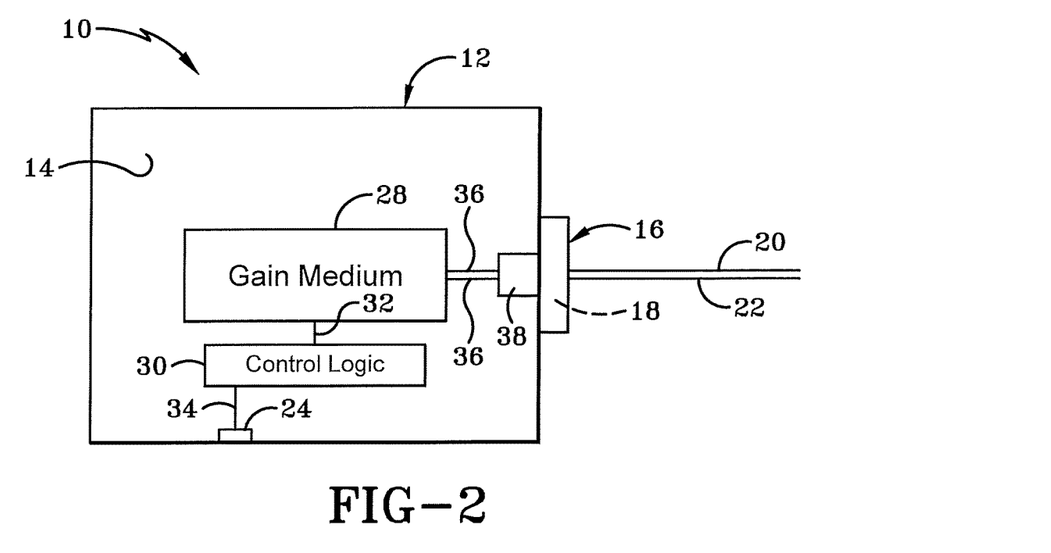
FIG. 2 is a schematic top view of the hybrid laser line replaceable unit detailing a single gain medium inside an internal cavity of the housing.

As depicted in FIG. 2, the first embodiment of hybrid laser line replaceable unit 10 includes a single gain medium 28 carried by housing 12 within internal cavity 14. Gain medium 28 may be operatively connected to a power source through a power input 26. Control logic 30 is operatively coupled to gain medium 28 via transmission line 32. The modulation control inlet 24 is connected to control logic 30 via transmission line 34. A laser output 36 may directly exit single gain medium 28 and travel freely or through a transmission line, both of which are represented by reference numeral 36 to combining logic 38.

First laser beam 20 is generated in gain medium 28 within internal cavity 14 and travels along output 36 through combining logic 38 and through laser beam exit aperture 16 and lens 18. In one particular embodiment, the first laser beam 20 is a pulsed laser beam receiving modulation signals from a legacy modulation source 40 to pulse first laser beam 20 as one having ordinary skill in the art would understand. Second laser beam 22 is generated within the single gain medium 28 inside internal cavity 14 and exits along output 36 through combining logic 38 through lens 18 at the laser beam exit aperture 16.

Figure 3A:
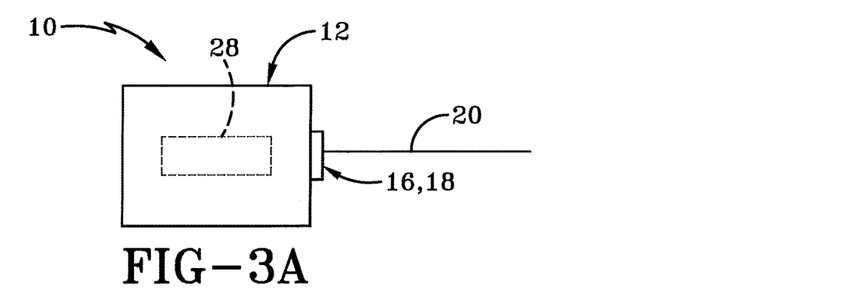
FIG. 3A is a schematic representation of a first laser beam generated from the single gain medium.
Figure 3B:
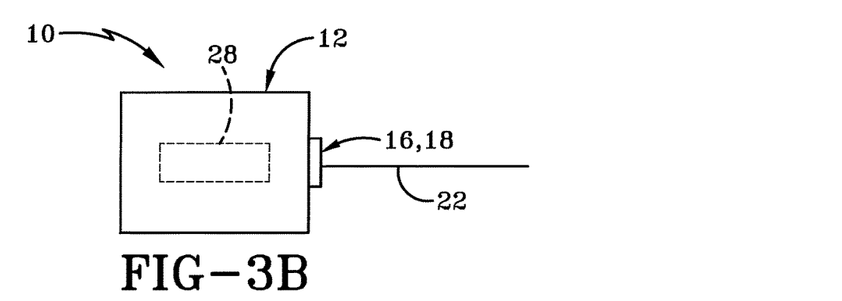
FIG. 3B is a schematic representation of a second laser beam generated from the single gain medium.
Figure 3C:
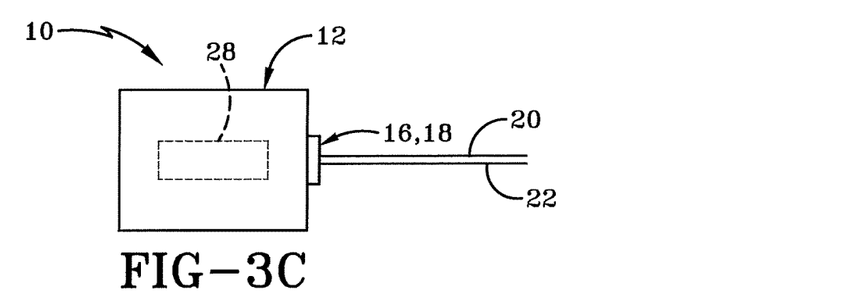
FIG. 3C is a schematic representation of the first and second laser beams generated from the single gain medium.
Figure 3D:
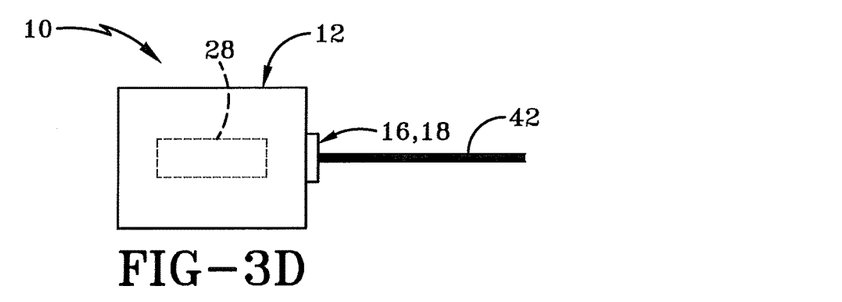
FIG. 3D is a schematic representation of a combined laser beam formed from the first and second laser beams generated from the single gain medium.

FIG. 3A represents and depicts first laser beam 20 on line replaceable unit 10 that may be generated independently as will be described in greater detail below. FIG. 3B represents depicts the second laser beam 22 being generated independently as will be described in greater detail below. FIG. 3C represents and details that the first laser beam 20 and the second laser beam 22 are generated simultaneously and synchronously but are not combined. FIG. 3D represents a combined laser beam 42 formed from the combination of first laser beam 20 and second laser beam 22. The combination of first and second laser beams 20, 22 to form combined laser beam 42 will be described in greater detail below with reference to combining logic 38.

Figure 4:
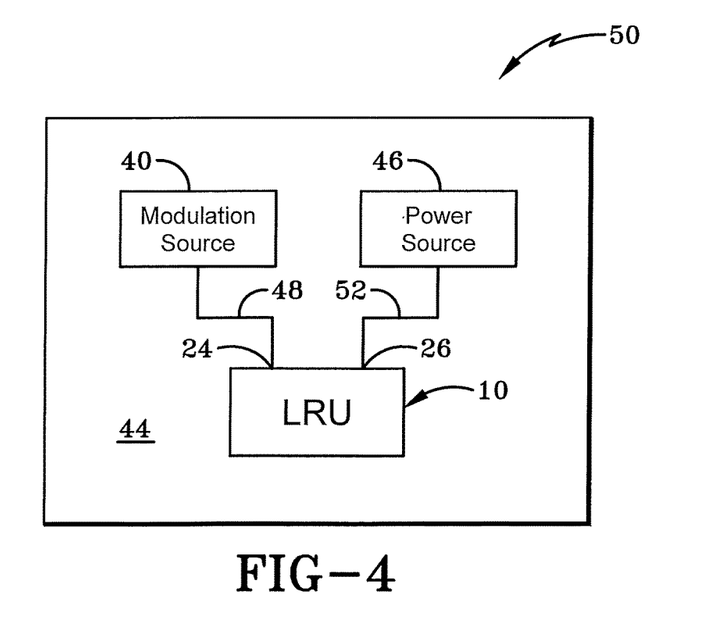
FIG. 4 is a schematic representation of a countermeasure system on a vehicle.

As depicted in FIG. 4, hybrid laser countermeasure line replaceable unit 10 may be integrated into an existing countermeasure system 50 existing on an aircraft 44 having an existing or legacy power source 46 and legacy modulation source 40. A transmission line 48 connects modulation source 40 to modulation control inlet 24 on the line replaceable unit 10. A transmission line 52 connects power source 46 with the power source inlet 26 on line replaceable unit 10. As will be described in greater detail below, line replaceable unit 10 is configured to replace an existing legacy single laser line replaceable unit system on an aircraft or other vehicle 44 operating a countermeasure system.

In system 50, modulation source 40 and power source 46 are external to the housing 12. The coupling between modulation source 40 and line replaceable unit 10 via transmission line 48 operatively connects modulation source 40 to first laser beam 20 through control logic 30 to generate the pulsed laser beam that is first laser beam 20. Second laser beam 22 is a continuous wave laser beam and the modulation source 40 may bypass the control logic with respect to second laser beam 22 because it is a continuous wave laser.

Figure 6:
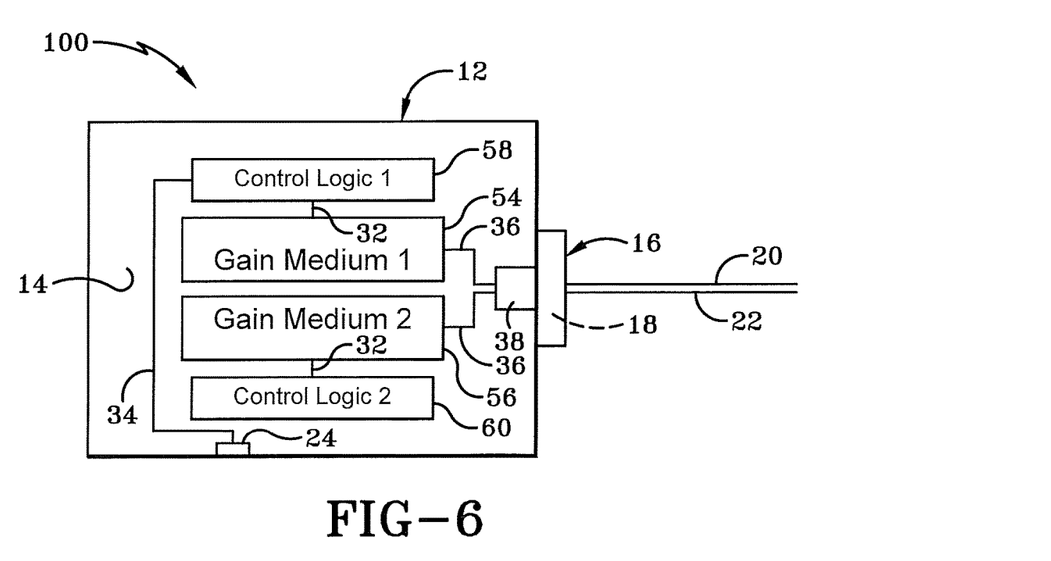
FIG. 6 is a schematic top view of the hybrid laser line replaceable unit of the second embodiment detailing a first gain medium and a second gain medium.

As depicted in FIG. 5 and FIG. 6, a second embodiment of a hybrid laser countermeasure line replaceable unit 100 includes a first gain medium 54 and a second gain medium 56, both carried by housing 12 inside internal cavity 14. A first control logic 58 is operatively coupled with first gain medium 54. A second control logic 60 is operatively coupled to second gain medium 56. Second control logic is coupled with modulation source 40 through inlet 24 and transmission line 34.

First control logic 58 is operatively coupled to first gain medium 54. As will be described in greater detail below, transmission line 34 transmits a modulated signal from modulation source 40 through control logic 58 into gain medium 54 to create a first laser beam 20 that is a pulsed laser beam. Second control logic 60 is operatively coupled to second gain medium 56 to control second laser beam 22 which is a continuous wave laser beam.

Figure 7A:
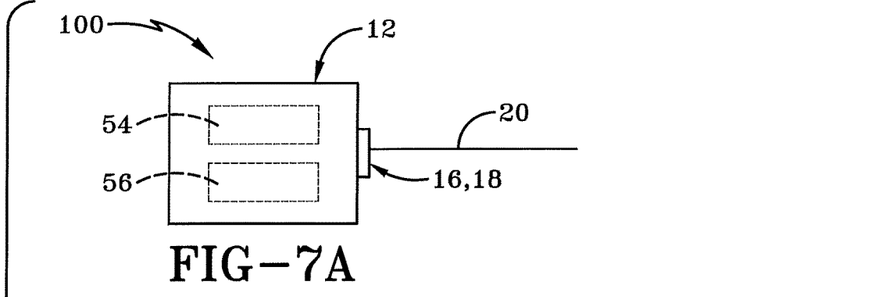
FIG. 7A is a schematic representation of a first laser beam generated from a first gain medium.
Figure 7B:
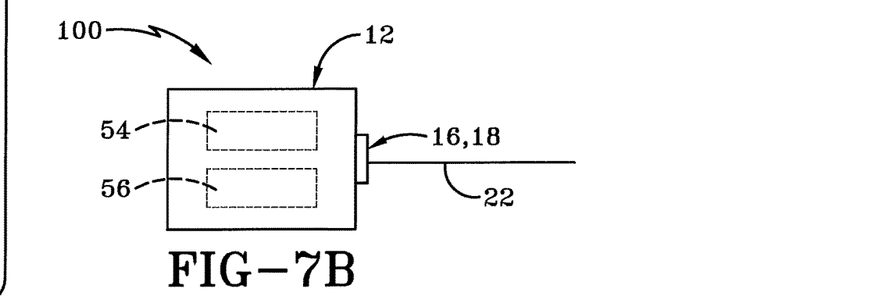
FIG. 7B is a schematic representation of a second laser beam generated from a second gain medium.
Figure 7C:
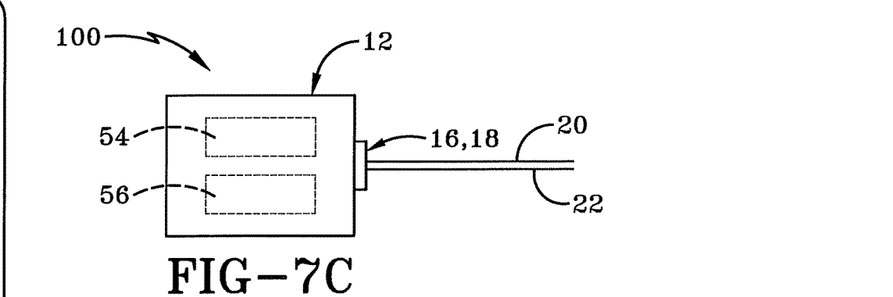
FIG. 7C is a schematic representation of the first laser beam generated from the first gain medium and the second laser beam generated from the second gain medium.
Figure 7D:
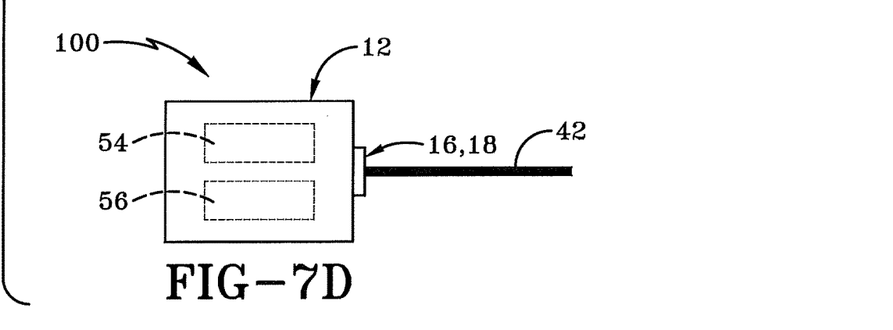
FIG. 7D is a schematic representation of a combined laser beam generated formed from the first laser beam and the second laser beam.

As depicted in FIG. 7A, first laser beam 20 may be generated from the first gain medium 54 as a pulsed laser beam independent from any other laser beam generated by line replaceable unit 100. FIG. 7B represents a second laser beam 22 generated from second gain medium 56 in the form of a continuous wave independent from any other laser beam within line replaceable unit 100. FIG. 7C depicts first laser beam 20 generated from first gain medium 54 and a second laser beam 22 generated from second gain medium 56. In this instance, first and second laser beams 20, 22 are generated synchronously and simultaneously. However, they are not combined and thus bypass combining logic 38. FIG. 7D represents a combined laser beam 42 formed from first laser beam 20 and second laser beam 22 combined in combining logic 38 which is downstream from the first and second gain mediums 54, 56.

Figure 8:
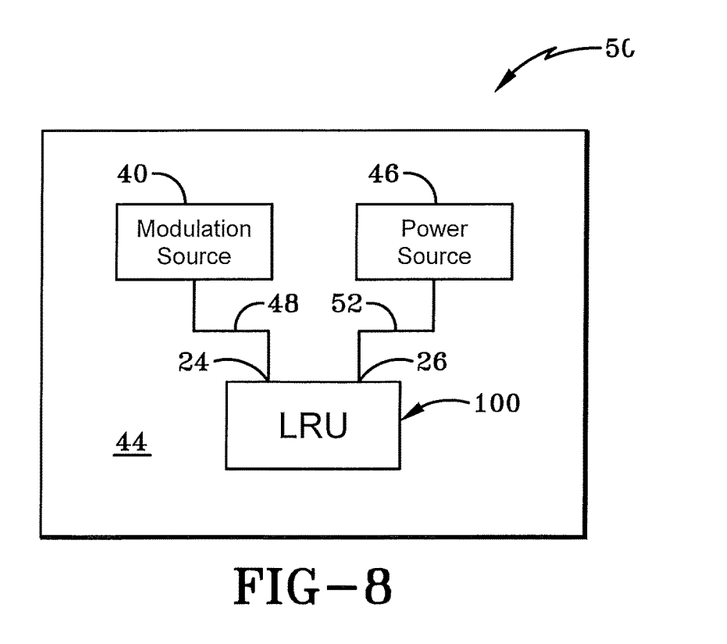
FIG. 8 is a schematic representation of the second embodiment of the hybrid laser line replaceable unit on a vehicle.

FIG. 8 depicts the countermeasure system 50 having a modulation source 40 and power source 46 on an aircraft 44 (also referenced as vehicle 44). Line replaceable unit 100 may be attached to respective transmission line 48, 52 at the modulation control inlet 24 and the power inlet 26. Line replaceable unit 100 is another embodiment that allows for countermeasure system 50 to create a unit that replaces a single laser unit from a countermeasure system on a vehicle that is configured to disable optically guided incoming threats.

Figure 9:
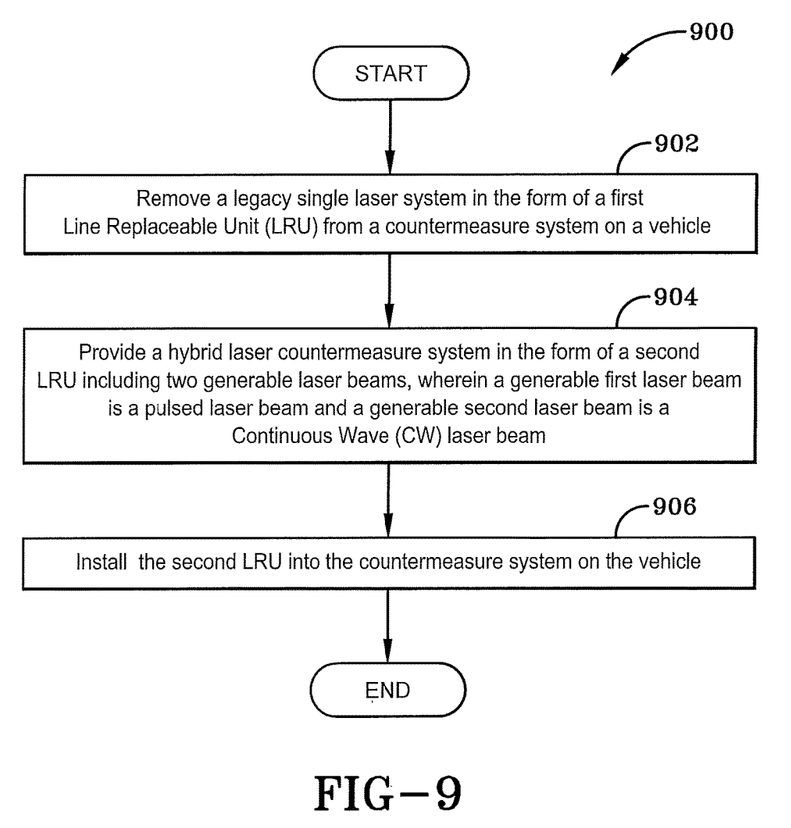
FIG. 9 is an exemplary flow chart representing a method of upgrading a countermeasure laser system.

FIG. 9 is a flow chart representing a method for upgrading the countermeasure laser system, and is shown generally as 900. The first step of the method 900 is removing a legacy single laser system in the form of a first replaceable unit (LRU) from a countermeasure system on a vehicle, shown generally as 902. Then, providing a hybrid laser countermeasure system in the form of a second line replaceable unit, which may be the first embodiment 10 or the second embodiment 100 or the third embodiment 200, including two generable laser beams, wherein a generable first laser beam 20 is a pulsed laser beam and a generable second laser beam 22 is a continuous wave laser beam, shown generally at 904. Then, installing the second LRU, either embodiment 10 or embodiment 100 or embodiment 200, into the countermeasure system 50 on the vehicle 44, wherein the second LRU is adapted to disable an incoming threat to the vehicle 44, shown generally at 906. The method 900 may further include the steps of then generating the first laser beam 20 and then generating the second laser beam 22. After the laser beams have been generated, the method 900 can further include the steps of targeting, either simultaneously or independently, the first and second laser beams at an optical guidance system on an incoming threat to the vehicle and then disabling the threat with the first and second laser beams. Alternatively, the method may include the step of combining the first and second laser beams via combining logic 38 to create a combined laser beam 42, having a sawtooth waveform, and then targeting the combined laser 42 at an optical guidance system on an incoming threat to the vehicle 44 in order to disable the threat with the combined laser beam 42. The method 900 may further include, wherein the step of generating the first laser beam 20 is accomplished by energizing a single gain medium 28 inside the line replaceable unit 10 and the step of generating the second laser beam 22 is accomplished by energizing the same single gain medium 28. The single gain medium in this step may create the first and second laser beams 20, 22 synchronously, or independently. The method 900 could also include the step of generating the first laser beam inside a second LRU 100 in a first gain medium 54 and generating a second laser beam 22 in LRU 100 in a second gain medium 56. The first and second laser beams 20, 22 generated in LRU 100 may be generated simultaneously or synchronously relative to each other or independently.

Figure 10:
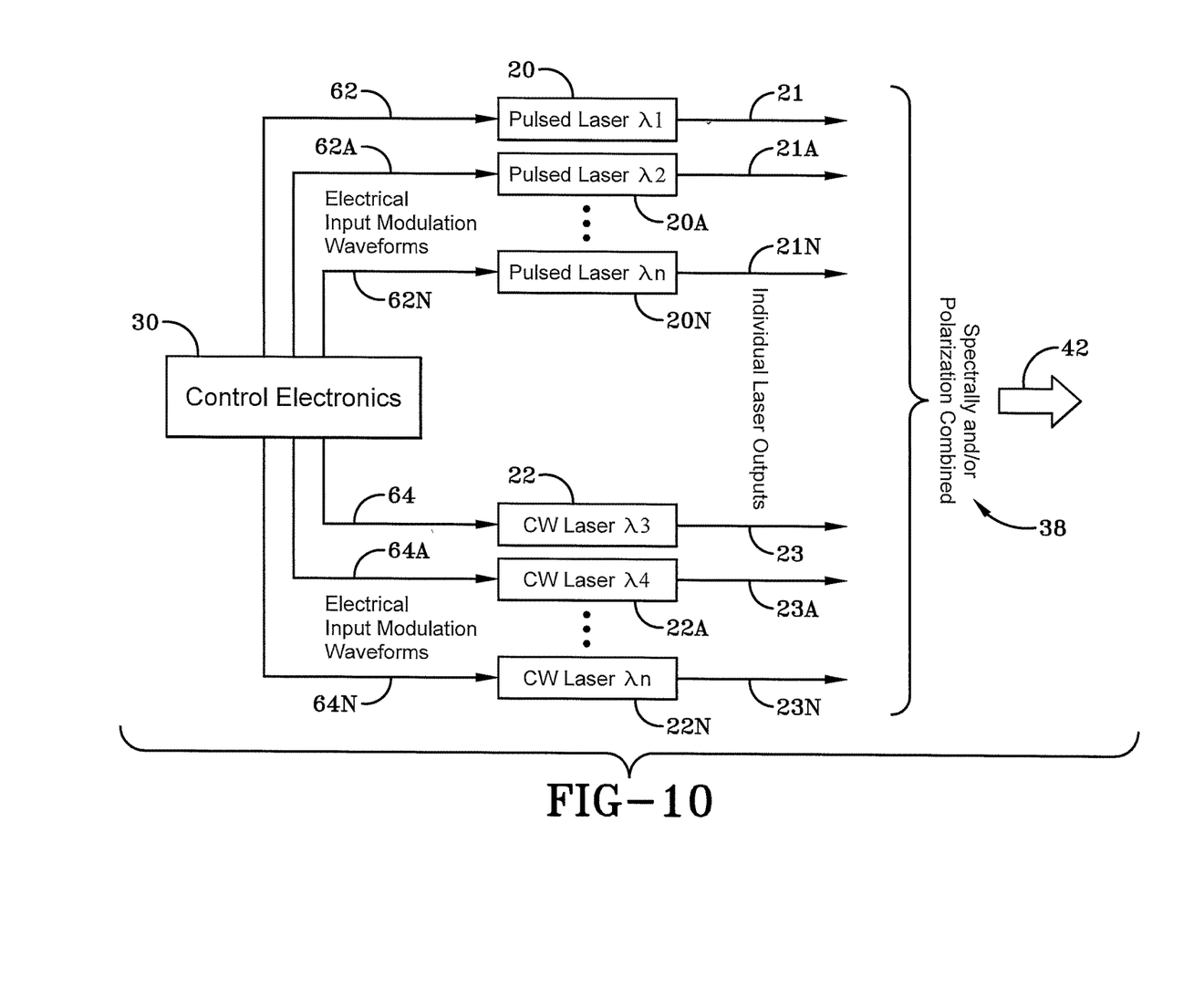
FIG. 10 is an exemplary schematic of the control electronics that may be applied in either the first embodiment detailed in FIG. 1 or the second embodiment detailed in FIG. 5.

FIG. 10 represents a schematic of the operational generation of the present disclosure expanded with more than two laser beams. Up to this point, the present disclosure has discussed the embodiments of the line replaceable units as generating two laser beams wherein as first laser beam 20 is a pulsed laser beam and a second laser beam 22 is a continuous wave laser beam. However, it is entirely possible that the number of laser beams may be expanded up to a number N as necessary to accomplish the defensive objectives of countermeasure system 50. For example, as shown is FIG. 10, control logic 30 may be operatively coupled via transmission lines 62, 62A, 62N to respective pulsed lasers 20, 20A, 20N, wherein pulsed laser 20N represents any number of pulsed lasers within system 50. Each of the individual pulsed lasers 20 through 20N include individual laser outputs represented by reference numerals 21, 21A, and 21N respectively. In some implementations, it may be advantageous for control logic 30 to also operatively connect to the continuous wave lasers 22, 22A, and 22N. The control logic 30 will not necessarily dictate the pulsed modulations as required in pulsed lasers 20N but may send other generational signals and controls, as one having ordinary skill in the art would understand, along respective transmission lines 64, 64A, and 64N. Each continuous wave laser has its own individual output represented by 23, 23A, and 23N, respectively.

The outputs 21, 21A, 21N, 23, 23A, and 23N may be combined in combining logic 38 in order to create combined laser beam 42. In some implementations, the combination of outputs 21 through 23N may be spectrally combined. In other implementations, the outputs of 21 through 23N may be polarization combined. In other implementations, the outputs 21 through 23N may be both spectrally and polarization combined within the combining logic 38 as one having ordinary skill in the art would understand in order to generate the combined laser beam 42 having a unique waveform based on the inputs to combining logic 38. The methods of spatial beam combining (in combining logic 38) include but are not limited to the use of a grating, free space optics utilizing dichroic, trichroic, and N-chroic optical coatings, wherein N equals any number of known chroic optical coatings. Additionally, the combined beam from the two laser beams may be formed form polarization combining A third embodiment of the hybrid laser countermeasure line replaceable unit 200 is provided in FIG. 11 and depicts an exit port 16 and a IR transparent lens 18 and a second laser beam exit aperture 66 and a second IR transparent lens 68 at the second exit aperture 66. Line replaceable unit 200 may include two gain mediums similar to that of embodiment 100 depicted FIG. 6 yet be free of, and not include, any combining logic 38, such that a pulsed laser beam exits one of the exits, either exit aperture 16 or exit aperture 66, and a continuous wave laser exits the other laser beam exit, either exit aperture 16 or exit aperture 66. The third embodiment 200 would operate in an environment where the first and second laser beams are generated simultaneously and synchronously such as shown in FIG. 7C.

In accordance with one aspect of the present disclosure, the hybrid laser is an integrated solution which provides size, weight, and power (SWaP) savings over several federated laser products. Additionally, the hybrid laser permits countermeasure systems to conduct incremental upgrades. Incremental upgrades to countermeasure systems are advantageous because the amount of money and time associated with development an entirely new countermeasure system for a vehicle, such as an aircraft, is extremely high.

In accordance with another aspect of the present disclosure, it should be readily apparent that a hybrid laser countermeasure system including both a pulsed and continuous wave laser is advantageous as it is more capable than conventional legacy single laser systems of defeating current and expected future optically guided missiles. It will also be appreciated that the hybrid laser of the invention which consists of both a pulsed and continuous wave laser provides improved targeting capability compared to conventional systems.

Each embodiment of the line replaceable unit 10, 100, and 200, are fabricated with SWaP savings in mind. In keeping with SWaP savings, housing 12 in manufactured from a lightweight rigid material typically used in other conventional lightweight line replaceable units. Some exemplary materials may be lightweight aluminums or other non-metals such as hardened polymers. Each of the gain mediums discussed herein, for example the single gain medium 28 or first gain medium 54 and second gain medium 56, may be fabricated from traditional gain mediums ordinarily used in the generating of a laser in order to create the source of optical gain within the laser itself. Some exemplary gain mediums include crystals, glasses, gases, semiconductors, and liquids, as one having ordinary skill in the art would understand. Further, while not made specific reference to herein, it is to be clearly understood that the general representation of the gain mediums also includes other natural components required for laser productions such as the reflective mirrors on each end of the gain medium and even a flash lamp or pump source to create the overall optical resonator.

In operation, a line replaceable unit of the present disclosure, such as the first embodiment line replaceable unit 10, may be utilized to upgrade a legacy single laser countermeasures system already in existence on an aircraft or other vehicle. Further, while vehicle 44 is referred to herein as an aircraft in one particular embodiment, clearly it is entirely possible that other vehicles such as ground moving vehicles may be utilized with the present disclosure. An operator removes the legacy single laser system from the countermeasures system 50 on an existing vehicle 44. Because the modulation source 40 and the power source 46 are external to the line replaceable units, those existing legacy sources remain as is in system 50. Hardware components are disconnected from the legacy single laser system and the line replaceable unit 10 of the present disclosure has inlets 24, 26 that are sized to receive transmission lines 48 and 52 without the need for upgraded connection ports or adapters. This is the same for the "plug-and-play" replacement device covered by the second embodiment LRU 100 and the third embodiment LRU 200.

With respect to the first embodiment LRU 10, power source 46 and modulation source 40 are activated after being connected to LRU 10 as a part of the countermeasure system 50. The modulation source 40 sends modulation signals to control logic 30 through inlet 24 on housing 12. Control logic 30 is preferably implemented in software and hardware components that are programmed to cooperate together to simultaneously create a first pulsed laser beam and a second continuous wave laser beam in a single gain medium 28. After the first and second laser beams are generated, they may be directed out of the exit aperture 16 on housing 12 simultaneously and synchronously as independent laser beams 20 and 22. Alternatively, combining logic 38 may be a traditionally known and conventional polarization or spectrally combining system in order to create a combined laser beam 42 formed from first laser beam 20 and second laser beam 22, both generated from a single gain medium 28. The step of combining the first and second laser beams via combining logic to create the combined laser 42 beam having the customized waveform (preferably a sawtooth waveform) is accomplished by one of the following: (a) spectral beam combining with a grating; (b) spectral beam combining with free space optics utilizing N-chroic optical coatings (i.e., dichroic, trichroic, and N-chroic optical coatings, wherein N equals any number of known chroic optical coatings); (c) polarization combining; and (d) spatial combining utilizing one or more of mirrors, lenses, optical fibers, or a combination thereof.

As depicted in FIG. 3, single gain medium 28 may independently generate first laser beam 20 (see FIG. 3A) and independently generate second laser beam 22 (see FIG. 3B). Additionally, single gain medium 28 may synchronously and simultaneously generate first laser beam 20 and second laser beam 22 (see FIG. 3C), wherein the first laser beam 20 is a pulsed laser beam and the second laser beam 22 is a continuous wave laser beam. When line replaceable unit 10 generates only first laser beam, as depicted in FIG. 3A, or only second laser beam 22, as depicted in FIG. 3B, the output from single gain medium 28 bypasses combining logic 38 since the single lasers are not combined in these instances. Similarly, when the first and second laser beams are generated independently, as depicted in FIG. 3C, the outputs of the two laser beams also bypass combing logic 38. Further, as shown in FIG. 10, while reference is made only to at least two laser beams, it is to be entirely understood that a plurality of pulsed laser beams represented as 20N may exist and a plurality of continuous wave laser beams represented as 22N may exist and each of their respective outputs may be combined, either spectrally, polarization, or both, in combining logic 38 to create combined beam 42.

The operation of second embodiment line replaceable unit 100 is similar to that as described above however, unit 100 includes two gain mediums. Particularly, once the second unit 100 is installed in countermeasures system 50 in a similar manner to that of the first embodiment, the first gain medium generates the first laser beam 20 and the second gain medium generates the second laser beam 22. In a similar fashion to the first unit and as shown in FIG. 7, the first and second laser beams 20, 22 generated from second embodiment line replaceable unit 100 may be generated independently or simultaneously and synchronously or may be combined through combining logic 38.

While the present disclosure has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

Further, the term "logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A method for upgrading a countermeasure laser system comprising the steps of:
    removing a legacy single laser system in the form of a first line replaceable unit (LRU) from a countermeasure system on a vehicle;
    providing a hybrid laser countermeasure system in the form of a second LRU including at least two generable laser beams, wherein a generable first laser beam is a pulsed laser beam and a generable second laser beam is a continuous wave (CW) laser beam;
    installing the second LRU into the countermeasure system on the vehicle, wherein the second LRU is adapted to disable an incoming threat to the vehicle; and
    connecting the second LRU to a legacy power source and a legacy modulation source on the vehicle.

2. The method of claim 1, further comprising the step of:
    generating the first laser beam; and
    generating the second laser beam.

3. The method of claim 2, further comprising the step of temporally combining the first and second laser beams via combining logic to create a combined laser beam having a customized waveform.

4. The method of claim 3, wherein the step of combining the first and second laser beams via combining logic to create the combined laser beam having the customized waveform is accomplished by one of the following:
    (a) spectral beam combining with a grating;
    (b) spectral beam combining with free space optics utilizing N-chroic optical coatings;
    (c) polarization combining; and
    (d) spatial combining utilizing one or more of mirrors, lenses, optical fibers, or a combination thereof.

5. The method of claim 4, further comprising the steps of:
    targeting the combined laser beam at an optical guidance system on an incoming threat to the vehicle; and
    disabling the threat with the combined laser beam.

6. The method of claim 2, wherein the step of generating the first laser beam is accomplished by energizing a single gain medium inside the second LRU and the step of generating the second laser beam is accomplished by energizing said single gain medium.

7. The method of claim 2, wherein the step of generating the first laser beam is accomplished by energizing a first gain medium inside the second LRU and the step of generating the second laser beam is accomplished by energizing a second gain medium inside the second LRU.

8. The method of claim 1, wherein the step of connecting the second LRU to the legacy power source and the legacy modulation source on the vehicle is accomplished by connecting existing hardware connections on the vehicle with the second LRU that were previously connected to the first LRU.

9. The method of claim 8, further comprising the steps of:
generating the first laser beam with power from the legacy power source external the second LRU;
modulating the first laser beam with modulation signals from the legacy modulation source external the second LRU; and
generating the second laser beam with power from the legacy power source.

10. A hybrid laser countermeasure line replaceable unit including:
a housing defining an internal cavity and a laser beam exit aperture;
a transparent lens at the laser beam exit aperture enabling passage of electromagnetic radiation therethrough;
a first laser beam generated from within the internal cavity and the first laser beam exiting the laser beam exit aperture, wherein the first laser beam is a pulsed laser beam;
a second laser beam generated from within the internal cavity and exiting the laser beam exit aperture, wherein the second laser beam is a continuous wave (CW) laser beam;
at least one gain medium disposed within the internal cavity for generating the first laser beam and the second laser beam;
a combined laser beam formed from the first and second laser beams combined together in combining logic and operatively coupled with the single gain medium, wherein the combined laser beam is configured to pass through the exit aperture; and
a modulation source external to the housing and part of a legacy countermeasure system on a vehicle, the modulation source operatively coupled to the control logic to control modulation pulses associated with the first laser beam;
wherein the hybrid laser countermeasure line replaceable unit is adapted to replace a legacy single laser unit from a countermeasure system on the vehicle and disable optically guided incoming threats.

11. The hybrid laser countermeasure line replaceable unit of claim 10, wherein the control logic is carried by the housing.

12. The hybrid laser countermeasure line replaceable unit of claim 11, wherein the control logic manages generation of the first and second beams in the gain medium synchronously.

13. The hybrid laser countermeasure line replaceable unit of claim 11, wherein the control logic manages generation of the first and second beams in the gain medium independently.

14. The hybrid laser countermeasure line replaceable unit of claim 10, further comprising:
a first gain medium disposed within the internal cavity generating the first laser beam; and
a second gain medium disposed within the internal cavity generating the second laser beam.

15. The hybrid laser countermeasure line replaceable unit of claim 14, further comprising:
the combined laser beam passing through the exit aperture formed from the first and second laser beams combined together in combining logic operatively coupled with the first and second gain mediums.

16. The hybrid laser countermeasure line replaceable unit of claim 15, wherein the combining logic forming the combined laser beam is carried by the housing.

17. A hybrid laser countermeasure system including:
a moveable vehicle adapted to defend against optically guided incoming threats;
a legacy power source on the vehicle adapted to power and generate at least one legacy laser beam;
a legacy modulation source on the vehicle adapted to modulate the at least one legacy laser beam;
a hybrid laser countermeasure assembly in the form of a line replaceable unit including generable first and second laser beams;
wherein the first laser beam is a pulsed laser beam powered by the legacy power source external the line replaceable unit and modulated by the legacy modulation source external the line replaceable unit;
wherein the second laser beam a continuous wave laser beam powered by the legacy power source external the line replaceable unit; and
wherein the hybrid laser countermeasure assembly in the form of the line replaceable unit is adapted to replace a legacy single laser unit from the countermeasure system on the vehicle to disable optically guided incoming threats.

* * * * *